Oct. 18, 1932.   O. TERVO   1,883,101
CRANBERRY PICKER
Filed Feb. 18, 1929   7 Sheets-Sheet 3

Inventor
Oscar Tervo
by *Heard Smith & Tennant*
Attys.

Oct. 18, 1932.　　　　O. TERVO　　　　1,883,101
CRANBERRY PICKER
Filed Feb. 18, 1929　　　7 Sheets-Sheet 6

Inventor
Oscar Tervo
by Heard Smith & Tennant.
Attys.

Oct. 18, 1932. O. TERVO 1,883,101
CRANBERRY PICKER
Filed Feb. 18, 1929 7 Sheets-Sheet 7

Inventor
Oscar Tervo
by Heard Smith & Tennant
Attys.

Patented Oct. 18, 1932

1,883,101

UNITED STATES PATENT OFFICE

OSCAR TERVO, OF NORWAY, MAINE, ASSIGNOR TO WILFRED B. MATHEWSON, OF NORTH WEYMOUTH, MASSACHUSETTS

CRANBERRY PICKER

Application filed February 18, 1929. Serial No. 340,773.

This invention relates to cranberry pickers and especially to that type of cranberry pickers comprising a main frame or truck adapted to be propelled over the bog and carrying a plurality of connected picking elements that are adapted to be brought successively into picking position.

A general object of my invention is to provide an improved cranberry picker which will pick the berries relatively clean and without injuring or tearing the vines.

Other objects of the invention are to improve generally cranberry pickers in various ways all as will be more fully hereinafter set forth.

In order to give an understanding of the invention I have illustrated in the drawings a selected embodiment thereof which will now be described after which the novel features will be pointed out in the appended claims.

Fig. 10 is a view of one of the rolls supporting the supplemental frame.

Figure 1:
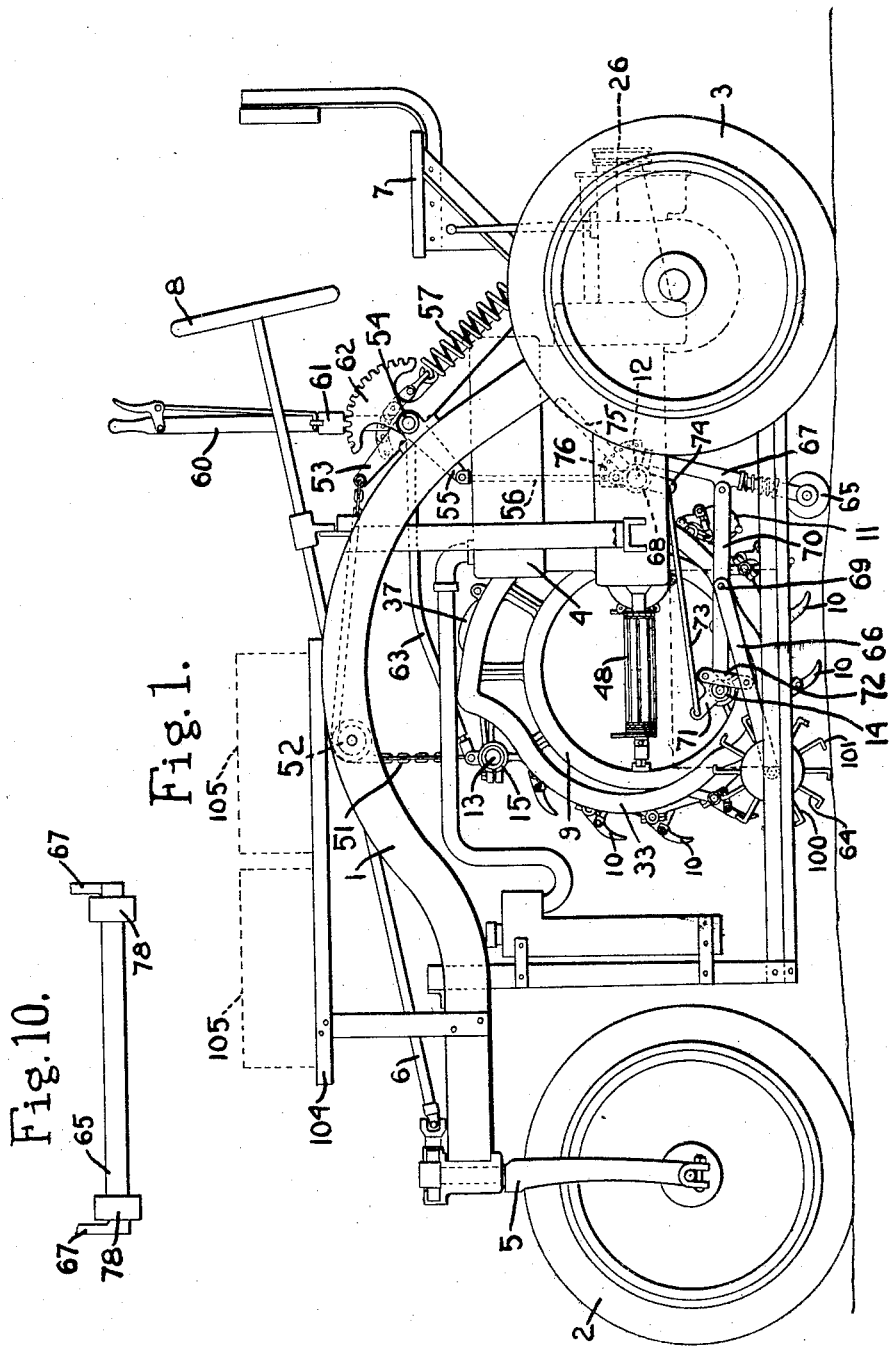
Fig. 1 is a side view of a cranberry picking machine embodying my invention.
Figure 2:
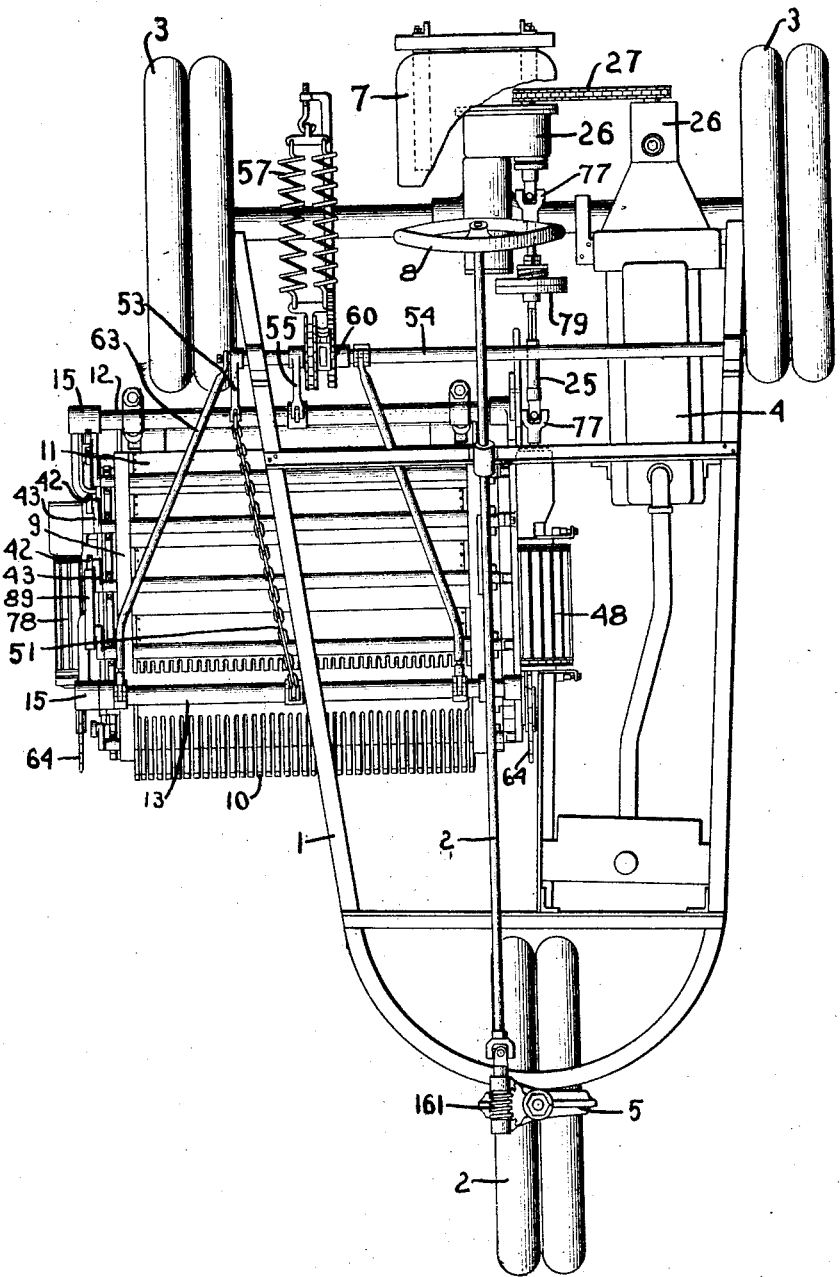
Fig. 2 is a top plan view.
Figure 3:
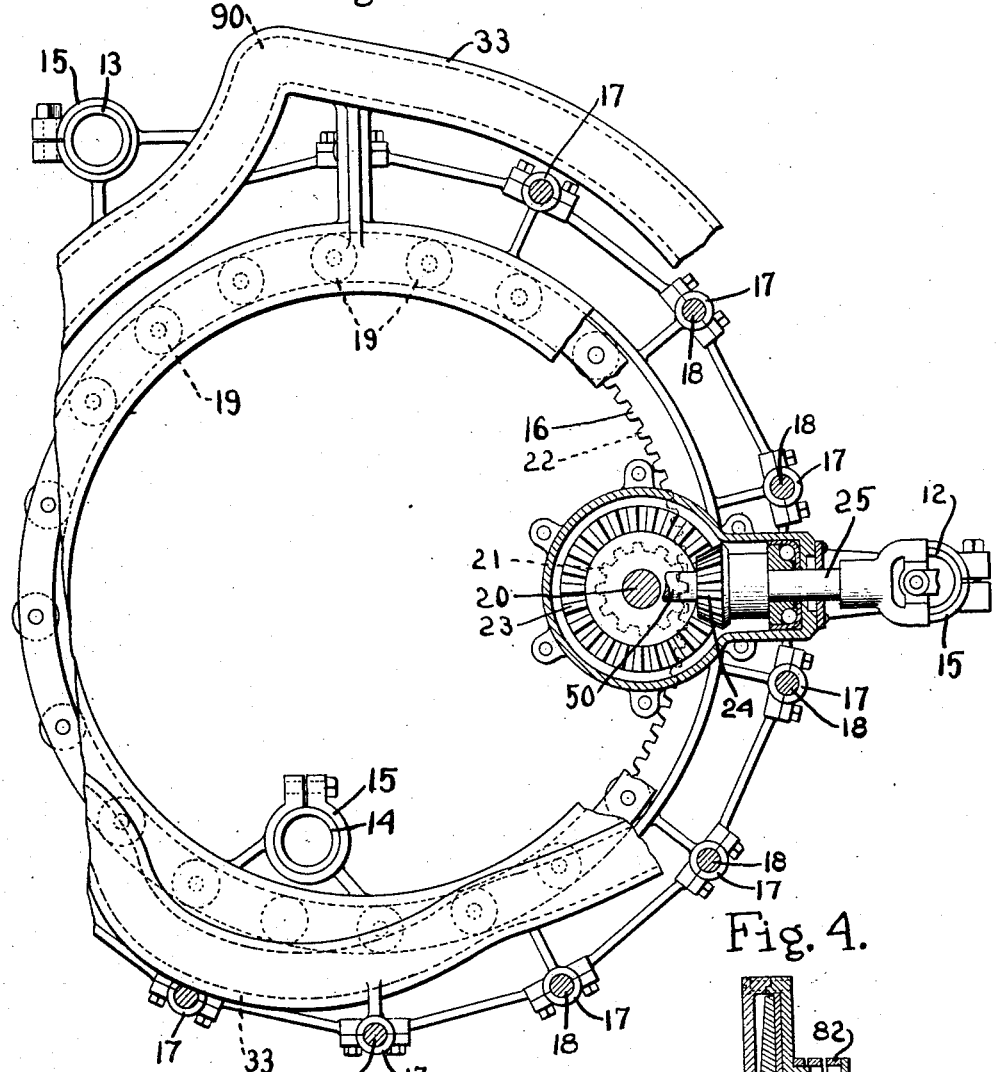
Fig. 3 is a fragmentary sectional view illustrating the manner of driving the carrier for the picking elements.
Figure 4:
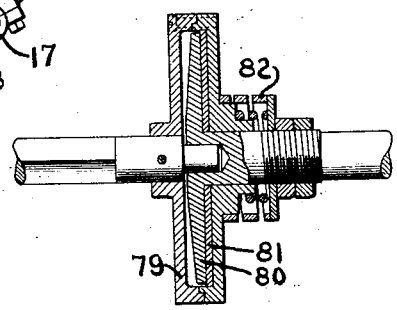
Fig. 4 is a sectional view of a friction clutch in the main drive.

The cranberry picker herein shown is of that type which is provided with a plurality of connected picking elements carried by a supporting frame adapted to be propelled over the bog and arranged to act successively in picking the berries.

The supporting frame of the construction herein shown is indicated generally at 1 and it is illustrated as a motor-propelled frame, it having the front or steering wheels 2 and the rear or driving wheels 3. The motive power for propelling the frame is an internal combustion engine 4 which is suitably mounted on the frame and which is geared in any usual way to the driving wheels 3. The front wheels 2 are steering wheels and they are carried in a fork 5 which is swivelled to the front end of the frame and is connected through suitable gearing 161 to a steering rod 6. The frame is provided with a suitable seat 7 for the operator and the steering rod 6 has a steering wheel 8 thereon situated within convenient reach of the operator occupying the seat 7.

The picking mechanism is mounted on a supplemental frame 9 which is separate from the main frame 1 and is adjustably supported thereby. The picking mechanism comprises a plurality of picking elements, each including a tined picking member and a scoop or receptacle member. The tined member of each picking element is indicated at 10 and the receptacle member at 11. These picking elements are carried by a rotary carrier which is mounted on the supplemental frame 9 and during the rotation of the carrier the tined member of each picking element is thrust into the cranberry vines beneath the berries, the corresponding receptacle member being at that time separated from the tined member.

After the tined member has entered the vines the two members of each picking elements are closed together and then during the rotation of the carrier the element is withdrawn from the vines thus stripping the berries therefrom. These berries as they are stripped will be retained in the receptacle member until the picking element has been carried around to the upper portion of the carrier at which time the two members of the picking element are separated to allow the berries to be discharged onto a conveyer which conveys them to a box or other receptacle.

The supplemental frame 9 which carries the picking mechanism comprises two end members which are connected by three transverse members 12, 13, 14. Each of these transverse members is in the form of a tube which is clamped at its ends in split bearings 15 formed in the end members of the frame 9. These tie members 12, 13, 14 thus hold the end members of the frame 9 in proper spaced relation and form a rigid structure. The manner of supporting the supplemental frame from the main frame will be presently described.

The carrier on which the picking elements are mounted is a sort of squirrel cage affair. It comprises two ring gears 16, each of which is provided with a plurality of bearings 17 which support shafts 18 carrying the picking elements. These ring gears are rotatably mounted on roller bearings 19 supported by the end members of the frame 9. The ring gears 16 of the squirrel cage carrier are rotated by gearing actuated by the motor 4.

The frame 9 supports a shaft 20 which is provided with pinions 21 that mesh with the gear teeth 22 of the ring gears 16. This shaft 20 has a bevel gear 23 thereon which meshes with and is driven by a bevel gear 24 on a driving shaft 25. Said shaft 25 extends to a gear box 26 which is provided with change gears of any usual construction and which in turn are connected to the motor 4 through the medium of a sprocket chain 27. The change gears in the gear box 26 provides means for varying the speed of operation of the machine as will be readily understood.

I have stated above that each shaft 18 carried a picking element and that each picking element included a tined member 10 and receptacle member 11. Each tined member 10 is fast to its shaft 18 and each receptacle member is pivotally mounted on the corresponding shaft 18, for which purpose each receptacle member is provided with two arms 28 that are loosely hung on the corresponding shaft 18. Each receptacle member also has an elbow lever 29 pivoted to one end thereof as shown at 30, one arm of the elbow lever being connected to the tined member 10 through the medium of a link 31 which is pivoted at one end to the elbow lever and at the other end to the tined member.

Figure 6:
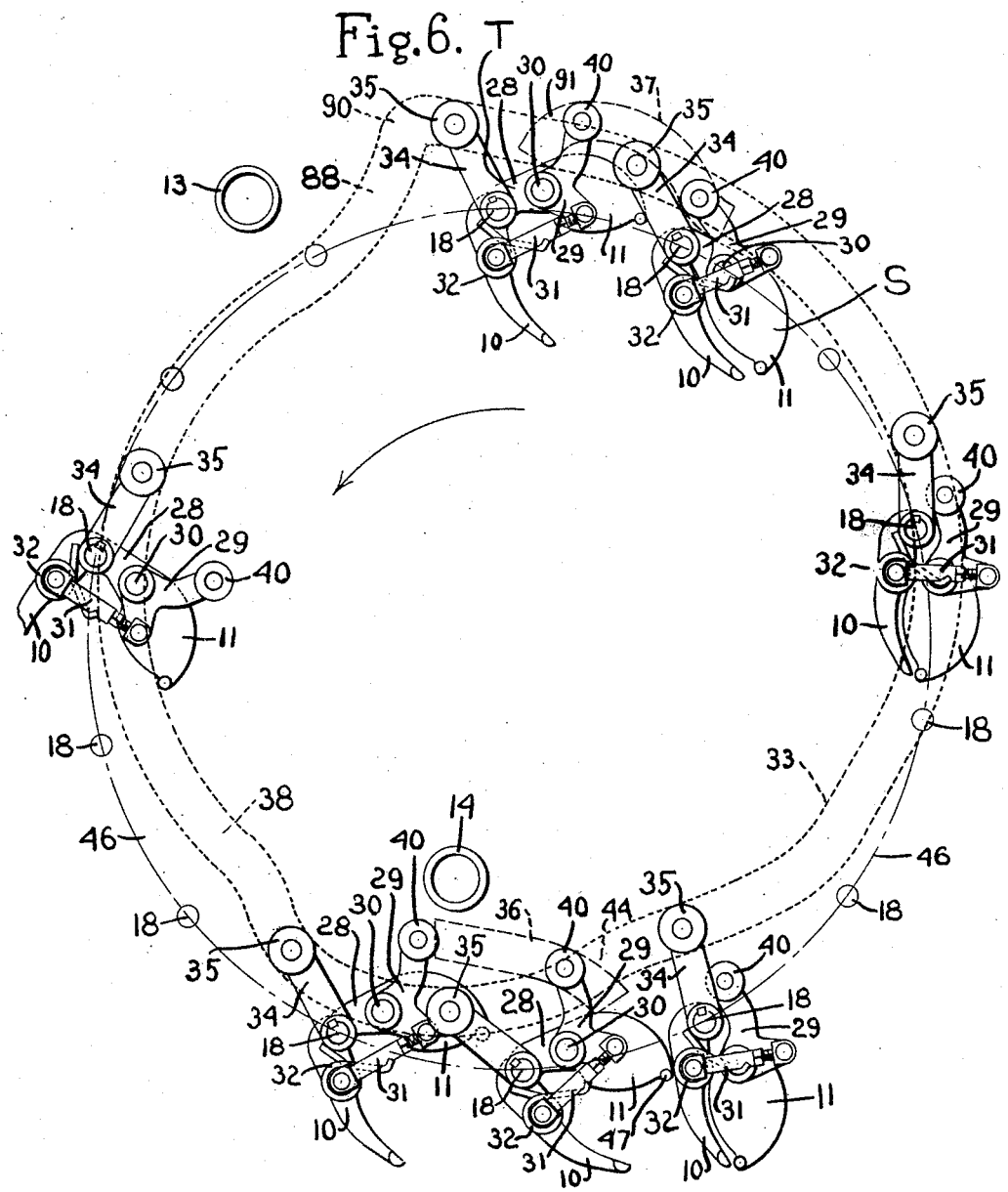
Fig. 6 is a view illustrating the operation of the cams for controlling the receptacle members of the picking elements.

Each link 31 is acted on by a spring 32 which normally tends to hold the receptacle member 11 separated from the tined member as shown at the left hand side of Fig. 6.

As the squirrel cage carrier rotates the picking elements are carried down into the vines and are then raised therefrom. A suitable cam mechanism is provided for giving the two members of each picking element an opening and closing movement as they are carried around by the carrier, said elements being opened when the picking element is thrust into the vines and then being closed when the element is being withdrawn from the vines. The cam mechanism which controls the movement of the tined members 10 is indicated at 33 and is shown in dotted lines in Fig. 6. This cam element is carried by the supplemental frame 9 and has a cam path with a contour such as shown in Fig. 6 and each shaft 18 has an arm 34 rigid therewith which is provided with a roll 35 that operates in the cam path 33.

The movements of each receptacle element 11 relative to its tined member 10 is controlled partly by the spring 32 and partly by cam elements 36, 37 that are carried by the frame 9 and are shown in dotted lines in Fig. 6. The cam 36 at the lower end of the frame is a closing cam which operates to close the receptacle member 11 onto the tined member 10 while the cam 37 at the upper end of the frame is an opening cam which opens the picking element by separating the receptacle member 11 from the tined member 10.

The arrow in Fig. 6 gives the direction in which the carrier rotates and the dot-and-dash line 46 shows the circular path of movement of the rock shafts 18. Upon reference to said figure it will be seen that as the picking elements are descending at the left hand side, each element will be open, the receptacle member 11 being held separated from the tined member through the medium of a spring 32. As the picking elements approach the vines the roll 35 passes through the eccentric portion 38 of the cam 33 thus rocking the tined member somewhat and bringing it into position so that it can be thrust into the vines 39. It will be observed that the main frame is being propelled toward the left Fig. 6 so that the tines 10 are thrust into the vines from front to rear or in a direction opposite to the travel of the machine. As each picking element reaches the lowest point in its travel and after the tined member has been thrust into the vines the receptacle member 11 will be closed against the tined member through the operation of the closing cam 36. This is a cam groove adapted to receive a roll or follower 40 on one arm of the elbow lever 29, the cam groove 36 being so shaped that as the carrier rotates the travel of the follower 40 through the cam groove 36 will cause the receptacle member 11 to be closed against the tined member.

Means are provided for automatically locking the receptacle member in its closed relation so that when the two members are closed they will remain closed until they are positively opened by the opening cam 37. The pivotal axis of the lever 29 has such relation to the link 31 that when each receptacle member is opened away from its tined member the pivotal axis of the lever 29 will be above the link 31 but when the two members are in closed relation this pivotal axis passes slightly below the axial line of the link thus serving to lock the two members in their closed relation.

The means for controlling the movement of the picking elements is such that after each picking element has been closed it is then rocked into a substantially vertical position and as the squirrel cage carrier continues to rotate it is drawn upwardly out of the vines thus stripping the berries therefrom. Furthermore, the receptacle member of each picking element co-operates with the tined member of the adjacent picking element to assist in stripping the vines from said adjacent picking element and as each picking element is rocked into its vertical position it serves to hold the vines down while the adjacent picking element is being raised from the vines thus preventing the vines from being torn up by the roots.

Figure 5:
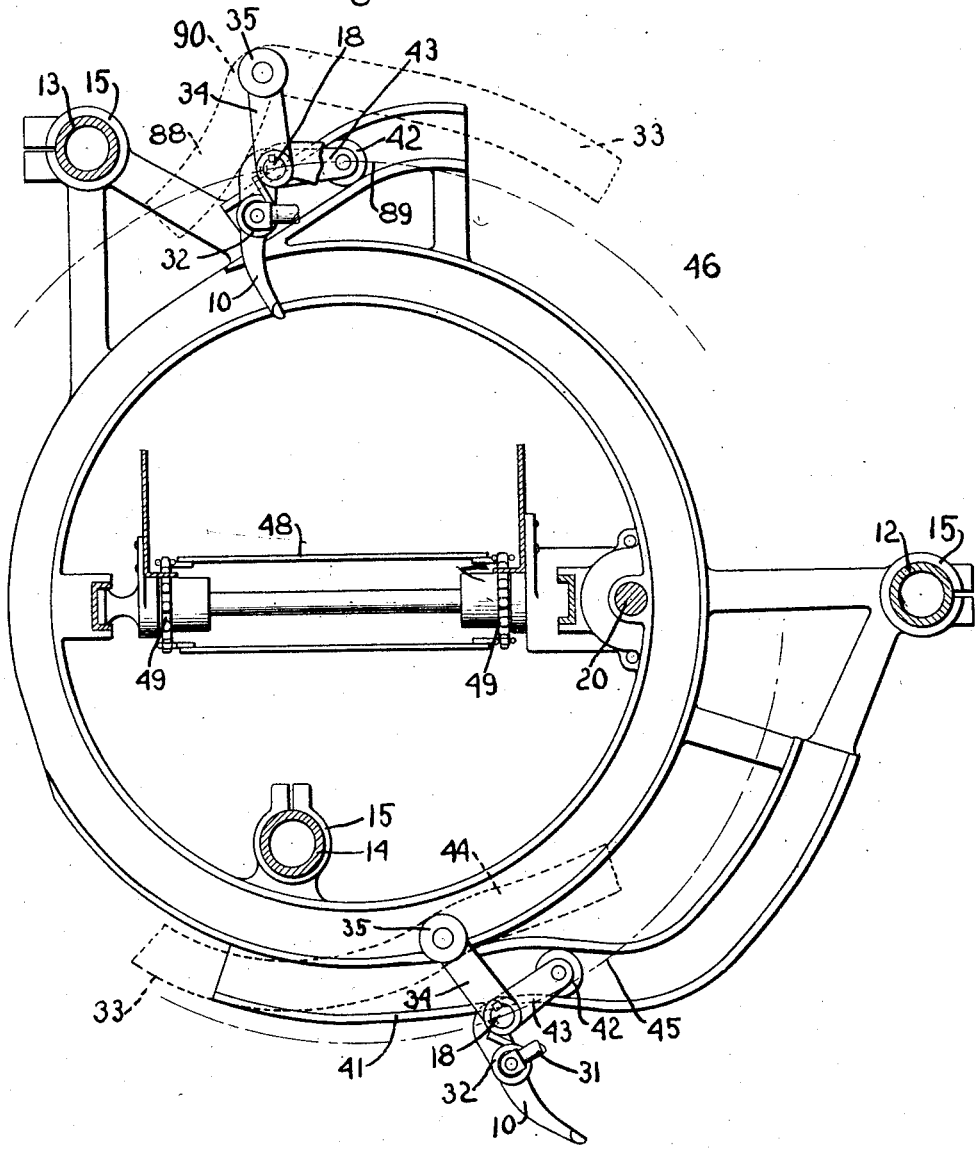
Fig. 5 is a fragmentary vertical sectional view through the carrier for the picking element illustrating the cams for controlling the picking members.

The above-described rocking movements of each picking element is secured through the co-operation of the cam track 33 and another cam track 41, see Fig. 5. The cam track 41 is situated at the opposite side of the supplemental frame from the cam track 33 and said cam track 41 co-operates with a roll 42 on an arm 43 which is rigid with the shaft 18. The cam track 41 is located on the lower side of the supplemental frame and is situated so that the roll 42 will enter therein just as the tined member 10 is being thrust into the vines, that is, while the tined member is passing around on the under side of the carrier. Just after the receptacle member 11 of each picking element is closed against the tined member 10 the roll 42 passes into the eccentric portion 45 of the cam track 41 which will cause the shaft 18 to be turned clockwise and during this movement the roll 35 is swung forwardly through the curved portion 44 of the cam track 33 with the result that the picking element will be rocked about the axis of its shaft 18 into a substantially vertical position as shown by the picking element indicated at $p$ in Fig. 9.

The right-hand portion of the cam track 33 in Fig. 6 is so shaped relative to the path of movement of the shaft 18 (which is indicated by the dot and dash line 46) that each picking element will be held in its vertical position as it is carried upwardly on the right-hand side of the squirrel cage. When the picking element reaches the upper side of the squirrel cage it will be opened to allow the berries to be discharged therefrom.

Figure 8:
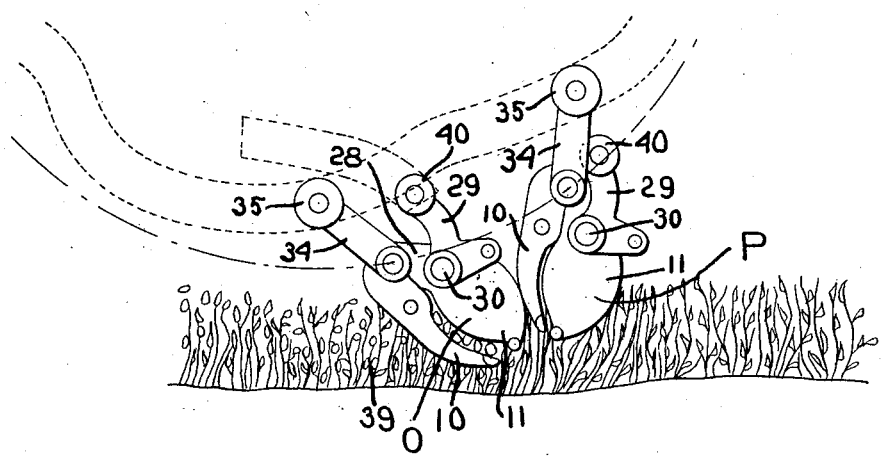
Figs. 8 and 9 illustrate the manner in which the picking elements operate.

During the closing movement of the receptacle member 11 of each picking element the front edge thereof moves downwardly closely adjacent the back side of the tined member 10 of the adjacent picking element. This is shown in Fig. 6. The picking element indicated $p$ has been rocked into its vertical position in said figure and the receptacle member 11 of the picking element $o$ in the rear is about to close. During the downward closing movement the edge 47 thereof will move downwardly closely adjacent to the rear face of the tined member 10 of the picking element $p$ and will thus assist in stripping the vines from said tined member. This operation is indicated in Fig. 8.

Figure 9:
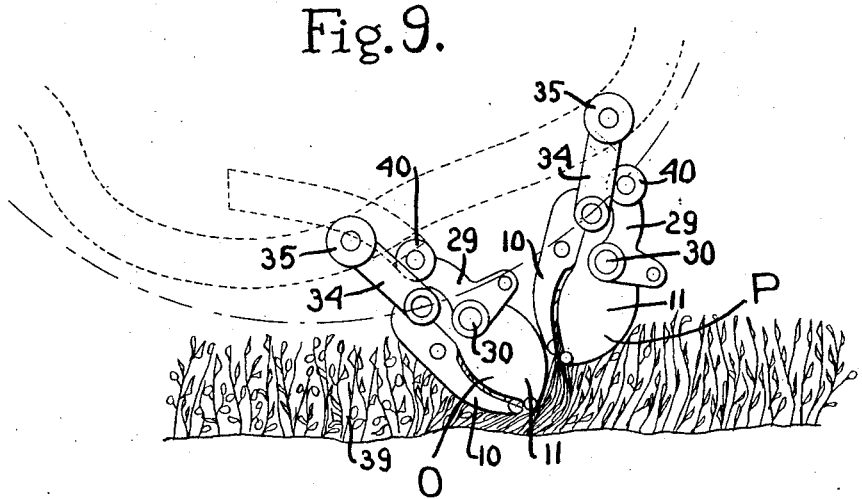

When the picking element $o$ has been closed and begins its rocking movement it serves to hold the vines down as indicated in Fig. 9 while the picking element $p$ is being raised. Each picking element thus assists to strip the vines from the preceding picking element and also to hold the vines while the preceding picking element is rising therefrom. This combined action greatly facilitates the picking of the berries from the vines without tearing up or injuring the vines.

When each picking element arrives at the upper part of the squirrel cage carrier it is opened and the berries therein are discharged onto an endless belt carrier 48 which extends longitudinally of the supplemental frame and substantially axially of the squirrel cage. The opening of each picking element is accomplished through the medium of the cam 37 which is situated at the upper side of the path of movement of the squirrel cage carrier. This cam 37 is in the nature of a cam groove open at its ends and is situated so that when each picking element arrives at substantially the point where the picking element $s$ is illustrated in Fig. 6, the roll 40 on the end of the bell crank lever 29 will enter the cam track 37. This cam track 37 has the sharp curved portion 91 adjacent its left hand end in Fig. 6 and during the movement of each picking element from the position indicated at $s$ in Fig. 6 to that indicated at $t$ the roll 35 of the picking element is travelling in the cam path 33 while the roll 40 is travelling the cam path 37. When the roll 40 reaches the sharply-curved portion 91 of the cam track 37 its forward motion will be retarded with relation to the movement of the shaft 18 as indicated by the position of the parts of the picking element $t$ Fig. 6. This serves to swing the receptacle member 11 away from the tined member 10 and thus open the picking element with the result that the berries will be discharged therefrom onto the conveyor 48.

After the picking element has been opened and the berries have been discharged therefrom then the rock shaft 18 is turned and it is swung clockwise so that as the picking element is descending the left hand side of the path of movement in Fig. 6 or is descending on the advance side of the squirrel cage carrier it will have substantially the position shown at the left hand side of Fig. 6. This swinging of the picking element is secured through the co-operation of the portion 90 of the cam track 33 and a cam track 89 (see Fig. 5) which is situated on the opposite side of the supplemental frame from the cam track 33. Just after each picking element has been opened the roll 42 on the arm 43, which it will be remembered is rigid with the rock shaft 18, is situated at the opposite end of said shaft from the arm 34, enters the open-ended cam track 89, and while said roll 42 is passing through this cam track the roll 35 comes into the relatively sharp angle 90 of the cam track 33. The cam track 33 extends inwardly sharply from the point 90 shown at 88 and crosses the path of movement of the shaft 18 which is indicated by the dot and dash line 46. As a result of the co-action of the inwardly-directed portion 88 on the roll 35 and the action of the campath 89 on the roll 42 the rock shaft 18 will be turned clockwise thus swinging the opened carrier bodily in a clockwise direction about its axis as it is being carried around by the squirrel cage carrier. This places the picking element into the position shown at the left hand side of Fig. 6. After the picking element has been opened it will be held open by the spring 32 as above described.

Figure 7:
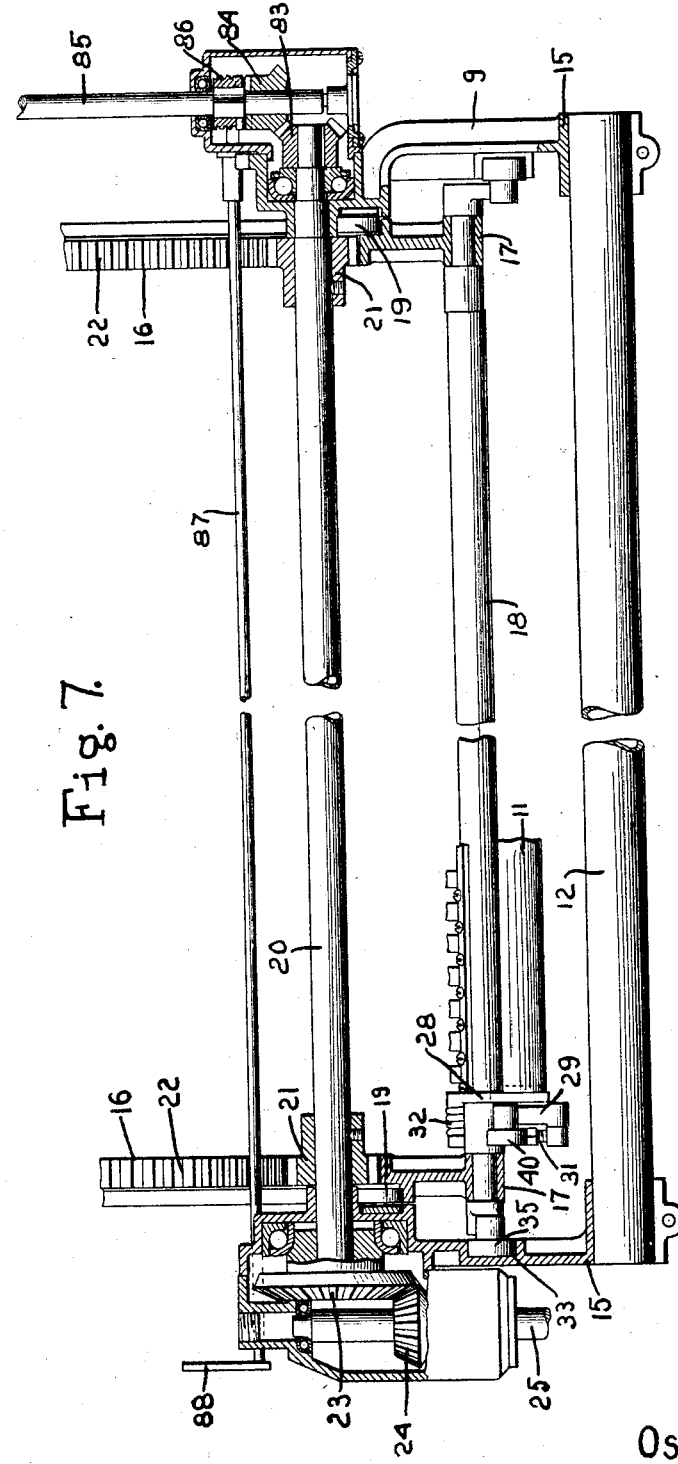
Fig. 7 is a sectional view illustrating the manner of driving the rotatable carrier for the picking element.

The conveyer 48 is of the endless belt type and it passes around suitable direction pulleys 49. This belt is operated from the cross shaft 20 which, as shown in Fig. 7, is provided at one end with a bevelled gear 83 which meshes with another bevelled gear 84 upon a shaft 85, the latter having mounted thereon two of the direction pulleys 49 which thus constitute driving pulleys. The gear 84 is loose on the shaft 85 and a suitable clutch is provided for clutching said gear to the shaft. This is shown as a clutch member 86 which rotates with the shaft but is slidable longitudinally thereof and which is provided with clutch projections adapted to co-operate with clutch projections on the gear 84. The clutch sleeve 86 is actuated to engage or disengage the clutch by a rock shaft 87 extending across the machine and having a lever 88 thereon by which it may be actuated.

The frame 1 may conveniently be provided with a suitable support, not shown, for carrying boxes or containers to receive the berries that are discharged from the delivery end of the apron 48.

During the operation of the machine the supplmental frame 9 is supported at its forward end by a pair of rolling supports 64 and at its rear end by the two rolls 78. There are two rolling supports 64, one on each side of the supplemental frame, and each rolling support comprises a plurality of radial arms 100 each terminating in a foot 101. These rolling supports 64 are located at the point where the picking elements enter the vines and if the bog is uneven they will roll over any humps or elevated portions of the bog and thus prevent the picking elements from entering too deeply into the vines in passing over such hump or raised portion. This form of rolling support is found to be especially advantageous because the provision of the feet 101 assists in shedding the vines so that these arms 100 will walk through the vines without becoming tangled therein.

The rear end of the frame is supported on two rolls 78 carried by a cross shaft 65. The shaft 65 is connected to struts 67 which at their upper ends are secured to brackets 68 that are clamped to the cross member 12 of the supplemental frame. Each strut 67 has a link 70 extending forwardly therefrom which is connected at its front end to a suitable bracket on the tie member 14.

The rolling supports 64 are journalled in the front end of arms 66 which are pivoted at 69 to the members 70. Each arm 66 has a link 72 connected thereto which is connected to one arm of an elbow lever 71 that is loosely mounted on the tie rod 14, the other arm of each elbow lever being connected by a link 73 to an arm 74 on a sleeve 68 that is loosely mounted on the tie member 12. This sleeve 68 has a handle 75 rigid therewith by which it may be turned and it is held in adjusted position by means of a pin extending through the lever and into the stationary quadrant plate 76. The swinging of the lever 75 forwardly will pull the rods 73 rearwardly thereby lowering the arm 66 with reference to the supplemental frame which will result in raising the frame. By means of this construction the vertical position of the pickers 10 relative to the ground surface may be adjusted.

63 represents strut members which are fastened at their upper end to the cross bar 13 and at their end to the cross bar 54 of the main frame. These strut members serve to hold the supplemental frame from fore-and-aft movement relative to the main frame.

The supplemental frame 9 which carries the picking mechanism is thus supported on the ground independent of the main frame, each frame having its own rolling supports. The wheels 2 and 3 constitute the rolling supports for the main frame and the members 64 and 78 constitute the rolling supports for the supplemental frame. Since each frame has its rolling supports which are independent from those of the other frame, each frame will follow any unevenness of the ground independent of the other frame. This is of considerable advantage because it allows the supplemental frame which carries the picking elements to follow unevenness in the ground independent of the main frame thereby increasing the efficiency of the machine.

Means are provided for raising and lowering the supplemental frame relative to the main frame. For this purpose said supplemental frame has a flexible connection 51 attached to the tie member 13 centrally thereof, which member 51 extends over a direction pulley 52 and is connected to one end of an arm 53 fast on the rock shaft 54 that is journalled in the main frame 1. The rock shaft 54 has another arm 55 rigid therewith which is connected by a suspender 56 to the tie rod 12. The connections 51 and 56 lead to the central portion of the tie rod, by reason of which construction free tilting movement of the supplemental frame 9 is permitted so that either end thereof may be readily raised or lowered with reference to the other end if the ground is uneven.

The rock shaft 54 has a control lever 60 rigid therewith and this lever is provided with a latch 61 adapted to latch into teeth on a quadrant 62. If it is desired to raise the supplemental frame bodily the control lever 60 is pulled rearwardly with the result that the arms 53, 55 will be given a clockwise movement, Fig. 1, which will result in lifting the supplemental frame bodily.

57 indicates a counterpoise spring connected at one end to the main frame and at the other end to the lever 60, said spring serving to partially counterbalance the weight of the supplemental frame.

The main frame 1 is shown as provided with a platform 104 on which may be placed extra boxes 105. These boxes may be empty boxes to be filled by the picker or may be boxes which have been filled with cranberries.

The driving shaft 25 is provided with universal joints 77 so as to obviate any binding of the driving connections due to vertical or rocking movement of the supplemental frame. This shaft also has a friction clutch 79 incorporated therein which will slip automatically in case undue resistance is encountered by the picking element. This clutch comprises the two friction clutch members 80, 81 having contacting friction faces which are yieldingly held in engagement by a suitable spring 82. The frictional engagement of the clutch members is sufficient to operate the machine under ordinary conditions but if any picking element meets undue resistance the clutch will give or slip thus preventing breakage of the parts.

While I have illustrated herein a selected embodiment of my invention I do not wish to be limited to the constructional features shown.

I claim:

1. In a cranberry-picking machine, the combination with a main frame having front and rear wheels on which it is supported, of a supplemental frame located between said front and rear wheels, rolling supports therefor which are independent from said wheels, means connecting the main frame and the supplemental frame and by which the forward movement of the main frame is imparted to the supplemental frame, and a plurality of connected but independently operating cranberry-picking elements mounted on the supplemental frame, and means to bring said elements successively into position to pick cranberries from the vines as the machine is moved forward.

2. In a cranberry picker, the combination with a main frame having means for propelling it forward, of a supplemental frame adjustably suspended from the main frame, a squirrel cage carrier rotatably mounted on the supplemental frame, a plurality of picking elements carried by said carrier and each comprising a tined member and a receptacle member, means to rotate the squirrel cage carrier, means to open each picking element and to cause the tined member of each tined element to enter the vines and then to close said element and raise it from the vines.

3. In a cranberry picker, the combination with a main frame, of a supplemental frame connected to the main frame but free to move vertically relative thereto and also to have a transverse rocking movement relative to the frame, a squirrel cage carrier rotatably mounted on the supplemental frame, a plurality of cranberry-picking elements, and means to rotate the squirrel cage carrier to bring said elements successively into cranberry-picking position.

4. In a cranberry picker, the combination with a frame having means for propelling it forward, of a supplemental frame connected to the main frame but capable of both vertical and tilting movement with respect thereto, a squirrel cage carrier rotatably mounted on the supplemental frame, a plurality of picking elements carried by the carrier, each picking element comprising a tined member and a receptacle member, cam mechanism mounted on the supplemental frame for opening each picking element and holding it open while the tined member is thrust into the vine and then for closing said element, whereby each element strips the berries from the vines as it is raised therefrom, the berries being retained in the receptacle member.

5. In a cranberry picker, the combination with a frame, of a plurality of connected picking elements mounted thereon, each comprising a tined member and a receptacle member, means to cause the tined members of the picking elements to enter the vines successively, and means to move the receptacle member of each element into closed relation after the tined member has entered the vines, the adjacent picking elements having such relation that the closing movement of each receptacle member strips the vines from the tined members of the adjacent picker.

6. In a cranberry picker, the combination with a frame, of a plurality of connected picking elements mounted thereon, each comprising a tined member and a receptacle member, means to cause the tined members of the picking elements to enter the vines successively, and means to move the receptacle member of each element into closed relation after the tined member has entered the vines, the adjacent picking elements having such relation that each receptacle member in its closing movement passes close to the back face of the tined member of an adjacent closed picking element thereby stripping the vines from said tined member.

7. In a cranberry picker, the combination with a frame, of a plurality of connected picking elements mounted thereon, each comprising a tined member and a receptacle member, means to operate said elements to cause the tined members thereof to enter the vines and then to move the corresponding receptacle member into closed position and subsequently to withdraw the closed picking element from the vine, the relation between adjacent picking elements being such that each element when closed serves to hold down the vines when each adjacent closed element is being withdrawn.

8. In a cranberry picker, the combination with a main frame, of a supplemental frame connected thereto, independent rolling supports for each frame, a squirrel cage carrier rotatably mounted on the supplemental frame, a plurality of rock shafts mounted on said carrier, a picking element carried by each rock shaft, each picking element comprising a tined member rigid with the rock shaft and a receptacle member pivotally mounted thereon, movement of the carrier bringing the picking elements successively into picking position, cam tracks rigid with the supplemental frame, and followers carried by each rock shaft and said receptacle members and co-operating with said cam tracks to close the members of each picking element after the tined member has been thrust into the vines, and then to open said members after they have been withdrawn from the vines.

9. In a cranberry picker, the combination with a main frame, of a supplemental frame connected thereto and movable vertically with respect to said frame, a plurality of connected picking elements mounted on the supplemental frame, means to bring the picking elements successively into picking position and to withdraw said elements from the vines, each picking element comprising pivotally connected members, one of which is a tined member and the other of which is a receptacle member, means for closing the complemental members of each picking element after the tined member has been thrust into the vines and then opening them after they have been raised from the vines, and a connection between each pair of complemental members which is adapted to hold them either in an open or a closed position.

10. In a cranberry picker, the combination with a main frame, of a supplemental frame connected thereto and movable vertically with respect to the main frame, a squirrel cage carrier rotatably mounted on the supplemental frame, a plurality of picking elements mounted on the carrier, each picking element comprising complemental members pivoted together, one of which is a tined member and the other of which is a receptacle member, means to rotate the squirrel cage carrier, means controlling the relative movement of the members of each picking element so that the tined members will be thrust into the vines as the carrier rotates and then the members will be closed together and withdrawn from the vine, and a yielding locking device connecting the members of each picking element which yieldingly holds them in either closed or open position.

11. In a cranberry picking machine, the combination with a main frame, of a supplemental frame connected thereto, independent rolling supports for each frame, a rotary carrier mounted on said supplemental frame, picking elements mounted on the carrier, a motor on the main frame for propelling the latter, driving connections between the motor and the carrier for rotating the latter, and a slip clutch in said driving connections.

12. In a cranberry picker, a combination with a main frame having means to propel it forward, of a supplemental frame, a squirrel cage carrier rotatably mounted on the supplemental frame, picking elements sustained on said carrier, supporting rollers connected to the supplemental frame, means for adjusting said rollers vertically relative to said supplemental frame, and means connecting said supplemental frame and main frame to permit relative vertical movement of said frames and also rocking movement of the supplemental frame.

13. In a cranberry picking machine, the combination with a main frame having means for propelling it forward, of a supplemental frame adjustably suspended from the main frame, independent rolling supports for each frame, whereby each frame may follow unevenness in the ground independent of the other frame a plurality of picking elements carried by the supplemental frame, means to operate said elements to bring them successively into picking position, and rolling supports for the supplemental frame each in the form of a wheel having radial arms, each arm terminating in a foot.

14. In a cranberry-picking machine, the combination with a main frame having front and rear supporting wheels, of a supplemental frame situated between the front and rear wheels, rolling supports for the supplemental frame independent from said wheels, a motor on the main frame for propelling it, means connecting the main frame and supplemental frame which imparts the forward movement of the main frame to the supplemental frame but permits each frame to follow the contour of the ground independently, cranberry-picking mechanism on the supplemental frame, and means for operating the same from the motor.

15. In a cranberry-picking machine, the combination with a main frame having front and rear supporting wheels, of a supplemental frame situated between the front and rear wheels, rolling supports for the supplemental frame independent from said wheels, a motor on the main frame for propelling it, means connecting the main frame and supplemental frame which imparts the forward movement of the main frame to the supplemental frame but permits each frame to follow the contour of the ground independently, a plurality of connected picking elements mounted on the supplemental frame, each picking element comprising a tined member and a receptacle member, means for moving the connected picking elements to bring them successively into picking position, cam mechanism mounted on the supplemental frame for opening each picking element and holding it open while the tined member is thrust into the vines and for rocking each picking element into vertical position before it is withdrawn from the vines and for opening said members after they have been withdrawn from the vines.

16. In a cranberry picker, the combination with a main frame having rear driving wheels and a front steering wheel, of a supplemental frame situated between the front and rear wheels and outside the line of travel of the steering wheel in front of one of the rear wheels, rolling supports for the supplemental frame which are separate from said wheels, connections between said frames by which each frame is permitted to follow the contour of the ground independently of the other frame as the cranberry picker moves forward, a plurality of connected but independently operating cranberry-picking elements mounted on the supplemental frame, means to bring said elements successively into position to pick cranberries from the vines as the machine is moved forward, and means to operate each element when in cranberry-picking position to cause it to pick cranberries from the vines.

In testimony whereof, I have signed my name to this specification.

OSCAR TERVO.